(12) United States Patent
Von Zwehl (10) Patent No.: US 11,257,314 B2
(45) Date of Patent: Feb. 22, 2022

(54) AUDITABLE SECURITY SYSTEM FOR SECURE ENCLOSURES

(71) Applicant: Scripps Safe, Inc., Naples, FL (US)

(72) Inventor: Jacqueline Von Zwehl, Naples, FL (US)

(73) Assignee: Scripps Safe, Inc., Naples, FL (US)

( * ) Notice: Subject to any disclaimer, the term of this patent is extended or adjusted under 35 U.S.C. 154(b) by 132 days.

(21) Appl. No.: 16/100,963

(22) Filed: Aug. 10, 2018

(65) Prior Publication Data
US 2020/0051350 A1  Feb. 13, 2020

(51) Int. Cl.
| | |
|---|---|
| G07C 9/25 | (2020.01) |
| G08B 13/196 | (2006.01) |
| H04N 7/18 | (2006.01) |
| E05G 1/04 | (2006.01) |
| E05G 1/10 | (2006.01) |
| E05B 65/00 | (2006.01) |
| E05B 47/00 | (2006.01) |
| G07C 9/27 | (2020.01) |
| G07C 9/32 | (2020.01) |
| E05B 45/06 | (2006.01) |
| G07C 9/26 | (2020.01) |

(52) U.S. Cl.
CPC ......... *G07C 9/257* (2020.01); *E05B 47/0001* (2013.01); *E05B 65/0075* (2013.01); *E05G 1/04* (2013.01); *E05G 1/10* (2013.01); *G07C 9/27* (2020.01); *G07C 9/32* (2020.01); *G08B 13/196* (2013.01); *H04N 7/181* (2013.01); *H04N 7/188* (2013.01); *E05B 2045/065* (2013.01); *E05B 2047/0067* (2013.01); *E05G 2700/04* (2013.01); *G07C 9/26* (2020.01)

(58) Field of Classification Search
None
See application file for complete search history.

(56) References Cited

U.S. PATENT DOCUMENTS

| | | | |
|---|---|---|---|
| 10,706,703 B1 * | 7/2020 | Barr .................... | G08B 13/08 |
| 2006/0181392 A1 * | 8/2006 | Watson ............. | G07C 9/00912 |
| | | | 340/5.73 |
| 2007/0267489 A1 * | 11/2007 | Borodulin .......... | E05B 47/0002 |
| | | | 235/382 |
| 2007/0273675 A1 * | 11/2007 | Wangler ............. | H04N 21/4312 |
| | | | 345/204 |

(Continued)

*Primary Examiner* — Kaitlin A Retallick
(74) *Attorney, Agent, or Firm* — Mark Terry (57) ABSTRACT

An auditable security system for preventing unlawful diversion of goods and/or services is provided. The security system includes a secure enclosure, an access control system that generates audit data, cameras proximal to the access control system, cameras located in the secure enclosure, a video management system that manages the cameras and generates video data, an exterior computing system configured to allow users to interface with the access control system, the video management system and data stored by the systems, and a database configured for storing data stored by the access control system and the video management system. When a user interacts with the access control system, the cameras begin generating audio and video data, which is stored, along with audit data, in the connected database. The audit data and video data is also provided to a third-party system for processing.

16 Claims, 6 Drawing Sheets

(56) References Cited

U.S. PATENT DOCUMENTS

| | | | | |
|---|---|---|---|---|
| 2008/0117966 A1* | 5/2008 | Topiwala | ............ | H04N 21/4183 375/240.01 |
| 2008/0150678 A1* | 6/2008 | Giobbi | ................ | G07F 17/3239 340/5.2 |
| 2009/0307255 A1* | 12/2009 | Park | ........................ | G06Q 10/10 |
| 2011/0181413 A1* | 7/2011 | Hamm | ............... | G07C 9/00912 340/541 |
| 2016/0308859 A1* | 10/2016 | Barry | ................. | G06K 9/00892 |

* cited by examiner

AUDITABLE SECURITY SYSTEM FOR SECURE ENCLOSURES

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The technical field relates generally to security systems and, more specifically, to processes for improving security systems for secure enclosures by providing auditable data for said systems.

BACKGROUND

A secure enclosure is any reinforced container, vault, cabinet, vault door, safe or room that is used to hold valuables. A secure enclosure typically includes an interior volume, a reinforced enclosure (usually composed of metal and/or composite material), a door, a lock and a user interface, with which the user interacts. There are a variety of different uses for secure enclosures, including in residential homes, medical offices, industrial warehouses, retail shops, banks, and the like. As a result, secure enclosures have been, and will continue to be, used in a wide range of different sectors for diverse applications.

One of the problems associated with conventional secure enclosures is the lack of a fully integrated security system. Typically, security systems for secure enclosures are built separately and later added to a secure enclosure. This limits the features of the security system and limits the range of secure enclosures that are compatible with said security system. Furthermore, a security system that is later added to a secure enclosure may not be compatible with other systems integrated with the secure enclosure, such as an access system.

Another problem with conventional secure enclosures is the inability of external nodes to interface with the access control system of the secure enclosure. For security reasons, typical access control systems are unitary systems that cannot interface with external nodes, such as databases and analytical tools. This reduces or eliminates the ability of users to gain analytical data about the use of the secure enclosure. This leads to another problem associated with conventional secure enclosures—the lack of auditable data. Conventional secure enclosures, especially secure enclosures with access control systems, usually lack the ability to store relevant data and metadata about the use of the secure enclosures, such as the dates and times the secure enclosure was accessed, the identity of the users that accessed the secure enclosure, the credentials used to access the secure enclosure, and the activity that occurred when the secure enclosure was accessed. This lack of information limits the ability of administrators and/or law enforcement to conduct an investigation if there is an unlawful diversion of valuables from the secure enclosure.

Therefore, a need exists for improvements over the prior art, and more particularly for more efficient methods and systems for providing a security system for secure enclosures for diverse applications.

SUMMARY

An auditable security system for secure enclosures is provided. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, an auditable security system for preventing unlawful diversion of goods and/or services is provided that solves the above-described problems. The security system includes: a secure enclosure, an access control system coupled to the secure enclosure, wherein the access control system comprises a user interface and an electronic lock for locking the secure enclosure, and wherein the access control system is configured to activate and deactivate the lock, a first set of one or more cameras proximal to the access control system, wherein the one or more cameras are configured to capture video of a user interacting with the user interface, a second set of one or more cameras located in an interior of the secure enclosure, wherein the one or more cameras are configured to capture video of a user interacting with the interior of the secure enclosure, a video management system communicatively coupled with the access control system and the first and second set of one or more cameras, wherein the video management system is configured store video data from the first and second set of one or more cameras, wherein the access control system is configured for: capturing audit data when a user interacts with the user interface, prompting the video management system to store video data from the first and second set of one or more cameras, and interfacing with third party software to provide access to the access control system and to data stored by the access control system and the video management system, an exterior computing system communicatively coupled with the access control system and the video management system, wherein the exterior computing system is configured to allow users to interface with the access control system, the video management system and data stored by the access control system and the video management system; and a database communicatively coupled with the exterior computing system, the database configured for storing data stored by the access control system and the video management system.

BRIEF DESCRIPTION OF THE DRAWINGS

The accompanying drawings, which are incorporated in and constitute a part of this disclosure, illustrate various example embodiments. In the drawings.

DETAILED DESCRIPTION

The following detailed description refers to the accompanying drawings. Wherever possible, the same reference numbers are used in the drawings and the following description to refer to the same or similar elements. While embodiments may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the claimed subject matter. Instead, the proper scope of the claimed subject matter is defined by the appended claims.

The claimed subject matter improves over the prior art by providing a more efficient, automated and precise way of providing an auditable security system for a secure enclosure to prevent unlawful diversion of goods and services. The example embodiments provide a security system that is fully integrated with the secure enclosure. That is, the security system is structurally integrated with the secure enclosure. This feature enhances the advantages of the security system and improves the range of secure enclosures that are compatible with said security system. Furthermore, the disclosed embodiments allow external nodes to interface with the access control system of the secure enclosure, which allows third party systems, such as databases, administrative and analytical tools, to provide added value to the disclosed embodiments. This feature enhances the ability of users to gain analytical data about the use of the secure enclosure. The disclosed embodiments further improve over the prior art by providing auditable data and metadata about the use of the secure enclosures, such as the dates and times the secure enclosure was accessed, the identity of the users that accessed the secure enclosure, the credentials used to access the secure enclosure, and the activity that occurred when the secure enclosure was accessed. This information enhances the ability of administrators and/or law enforcement to conduct an investigation if there is an unlawful diversion of valuables from the secure enclosure.

The disclosed embodiments are further applicable to a variety of different uses for secure enclosures, including in residential homes, medical offices, hospitals, industrial warehouses, retail shops, banks, secured government facilities, casinos, and the like.

Figure 1:
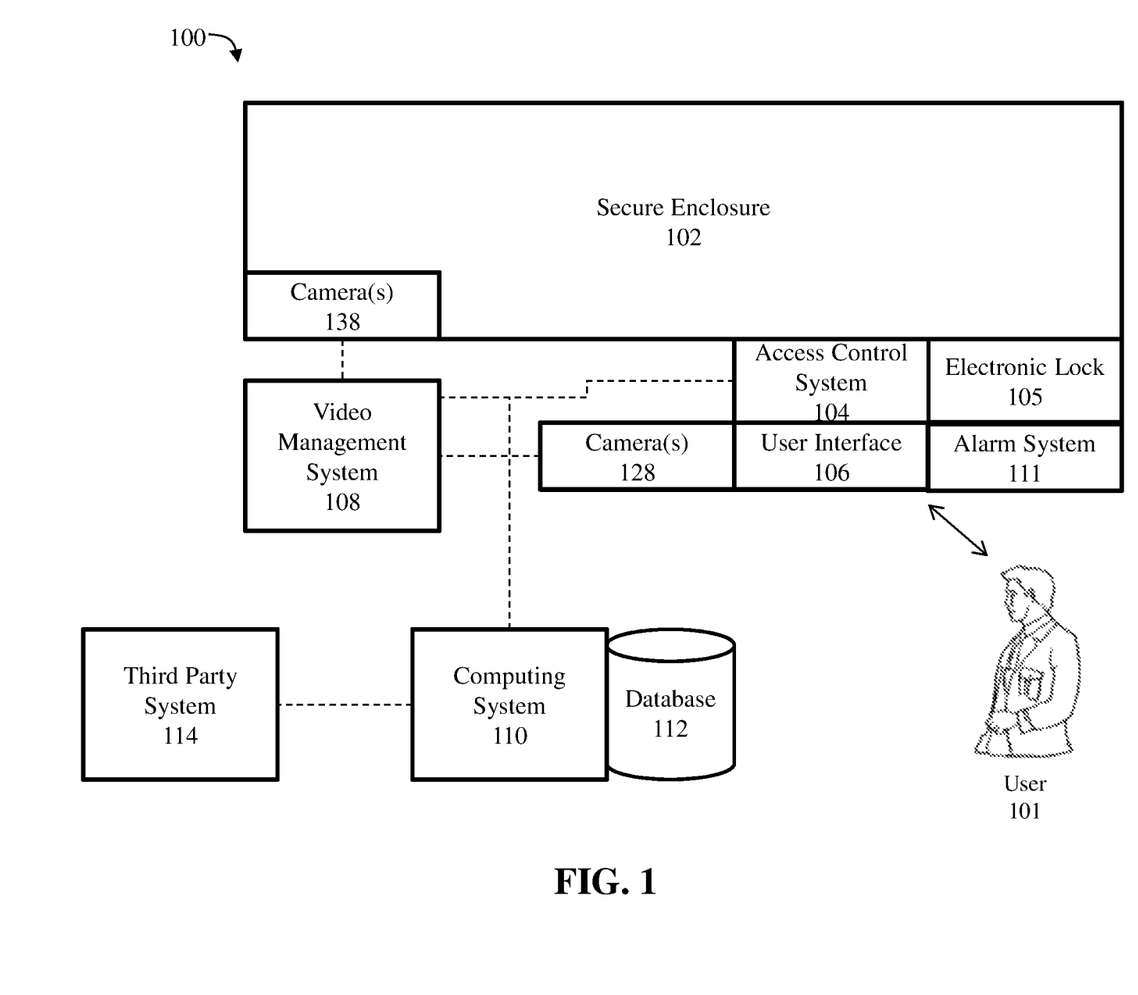
FIG. 1 is a block diagram of an auditable security system for a secure enclosure, according to an example embodiment.

FIG. 1 is a block diagram of an auditable security system 100 for a secure enclosure for preventing unlawful diversion of goods and/or services, according to an example embodiment. The secure enclosure 102 is any reinforced container, cabinet, vault, safe, vault door or room that is used to hold valuables. The secure enclosure 102 includes an interior volume, a reinforced enclosure (usually composed of metal and/or composite material), a reinforced door, and an electronic lock 105. The electronic lock 105 comprises an electrically controlled mechanism that locks and unlocks the door of the secure enclosure, such as activating and deactivating one or more latches or bolts of the door of the secure enclosure.

The secure enclosure 102 may also comprises an access control system 104 and a user interface 106, with which the user 101 interacts. The access control system 104 is a computing system that provides access to the secure enclosure. More specifically, the access control system 105 is a computing system that effectuates the selective restriction of access to the interior of the secure enclosure, or the valuables inside of it, or both. The act of accessing may include consuming, entering, or using, in order to gain authorization, and the access control system 104 uses the electronic lock 105 and login credentials as mechanisms of access control. The access control system 104 may accept single factor, two factor or multiple factor authentication as a credential. When a credential is presented to the user interface 106 of the access control system 104, the access control system 104 compares the credential to an access control list, and either grants or denies the presented request. When access is denied based on the access control list, the electronic lock 105 remains locked. If there is a match between the credential and the access control list, the access control system 104 operates a relay that in turn deactivates the electronic lock 105 to unlock the door.

The user interface 106 may be a dial, a keypad, a touchpad, a fingerprint sensor, a retinal scanner, a touch screen, a camera, a microphone, a face scanner or another biometric scanner. The user interface 106 provides the credential entered by the user 101 to the access control system 104. The credential may be an alphanumeric code entered by the user, a voice command entered by the user, and/or biometric data entered by the user, such as a fingerprint, face print, retinal scan, etc.

The access control system 104 collects and stores data and metadata about the use of the secure enclosure 102, such as the dates and times the secure enclosure was accessed, the identity of the users that accessed the secure enclosure, the credentials used to access the secure enclosure, and the activity that occurred when the secure enclosure was accessed. The aforementioned data is referred to as audit data. Audit data may further include a timestamp, a user identification, a time of engagement, a pointer to corresponding video data and a credentials entered by the user.

The auditable security system 100 also may also comprise an alarm system 111, with which the user 101 interacts. The alarm system 111 is a system that detects the opening of doors, activity outside or inside the secure enclosure and other information. The alarm system 111 may include door contacts, vibration sensors, motion sensors, heat sensors, seismic sensors, and the like. The alarm system may also include a computing system that logs said detection data (i.e., alarm output data) and provides it to the other systems, such as the computing system 110.

The auditable security system 100 also includes a video management system 108, which manages the interior cameras 138 and exterior cameras 128, as well as the data produced by the same. The interior cameras 138 may be located within the secure enclosure, such as on a wall or door of the interior of the secure enclosure. The exterior cameras 128 may be located exterior to the secure enclosure, such as in, on or adjacent to the user interface 106 of the secure enclosure 102. The cameras 128, 138 may be hidden or covert so as not to be noticed by users, and may collect audio data, and still image data, as well as video data.

The video management system 108 is communicably coupled to the cameras 128, 138 in either a wired or wireless fashion, and sends commands to the cameras to activate and deactivate recording of video. The video management system 108 receives video and/or audio data from the cameras 128, 138 and stores said data in a database integrated with video management system 108 or exterior to the video management system 108, such as database 112 described below. The video management system 108 is communicably coupled to the access control system 104 in either a wired or wireless fashion, and access control system 104 sends commands to the video management system 108 to activate and deactivate recording of video and/or audio.

The auditable security system 100 also includes an exterior computing system 110 communicably coupled to the access control system 104 and the video management system 108 in either a wired or wireless fashion. The exterior computing system 110 may collect audit data from the access control system 104 and audio/video data from the video management system 108. Data collected by the exterior computing system 110, including audit data, alarm output data and audio/video data, may be stored in the database 112, which may be a relational database comprising a Structured Query Language (SQL) database stored in an SQL server. Any data stored in the database 112, including audit data, alarm output data and audio/video data, may be encrypted. The exterior computing system 110 may perform analytical processes on the data and metadata stored in database 112, and further provide said data and metadata to a third-party system 114, such as third-party analytic software, in a format that is compatible with the third-party system. Therefore, before providing data or metadata to the third-party system, the system 110 may perform a formatting process to place the data in a format that is compatible with the third-party system. The exterior computing system 110 may be in close proximity to the secure enclosure, or may be located remotely, a long distance from the secure enclosure. The exterior computing system 110 may also be a desktop, workstation, server, virtual machine, laptop, tablet, mobile device, or web/cloud-based computing service.

The exterior computing system 100 is configured to allow users to interface with the access control system 104, the video management system 108 and data stored by the access control system and the video management system. That is, system 100 allows a user to log into the system 100 to manage the system 108, such as storing settings regarding how and when video is recorded and stored, regarding how long data is kept and regarding who has access to the system 108. System 100 also allows a user to log into the system 100 to manage the system 104, such as storing settings regarding how and when access and granted, regarding how long access is granted and regarding who has access. System 100 also allows a user to log into the system 100 to view video data 204 and audit data 202.

The exterior computing system 110, access control system 104 and video management system 108 may each comprise a computing device 600, described below in greater detail with respect to FIG. 6. It should be noted that although FIG. 1 shows only one exterior computing system 110, the system of the disclosed embodiments supports any number of exterior computing systems 110. Also note that although access control system 104 is shown as a single and independent entity, in one embodiment, system 104 and its functionality can be realized in a centralized fashion in one computer system or in a distributed fashion wherein different elements are spread across several interconnected computer systems.

Figure 2:
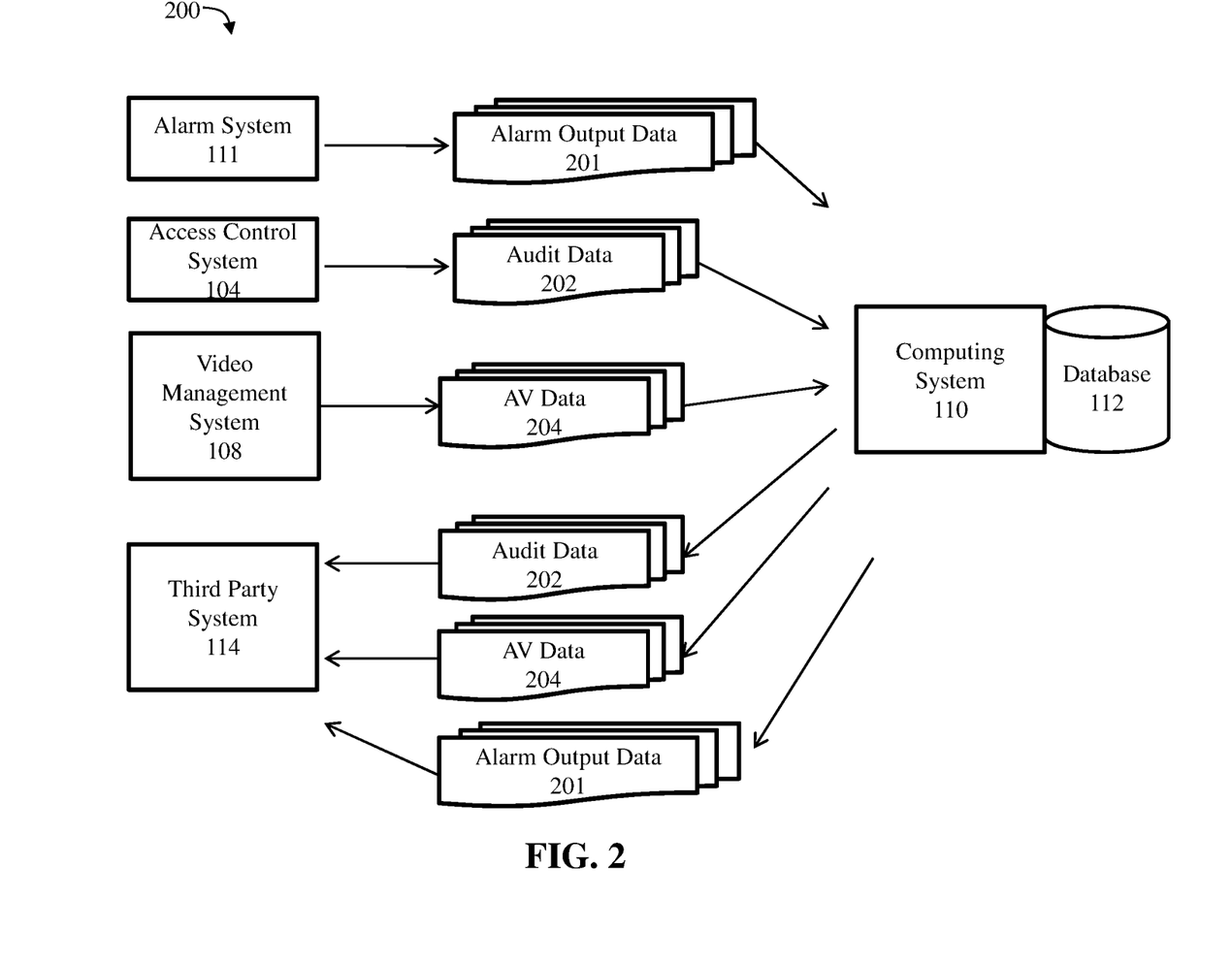
FIG. 2 is a diagram showing the data flow of the general process for providing an auditable security system for a secure enclosure, according to an example embodiment.
Figure 3:
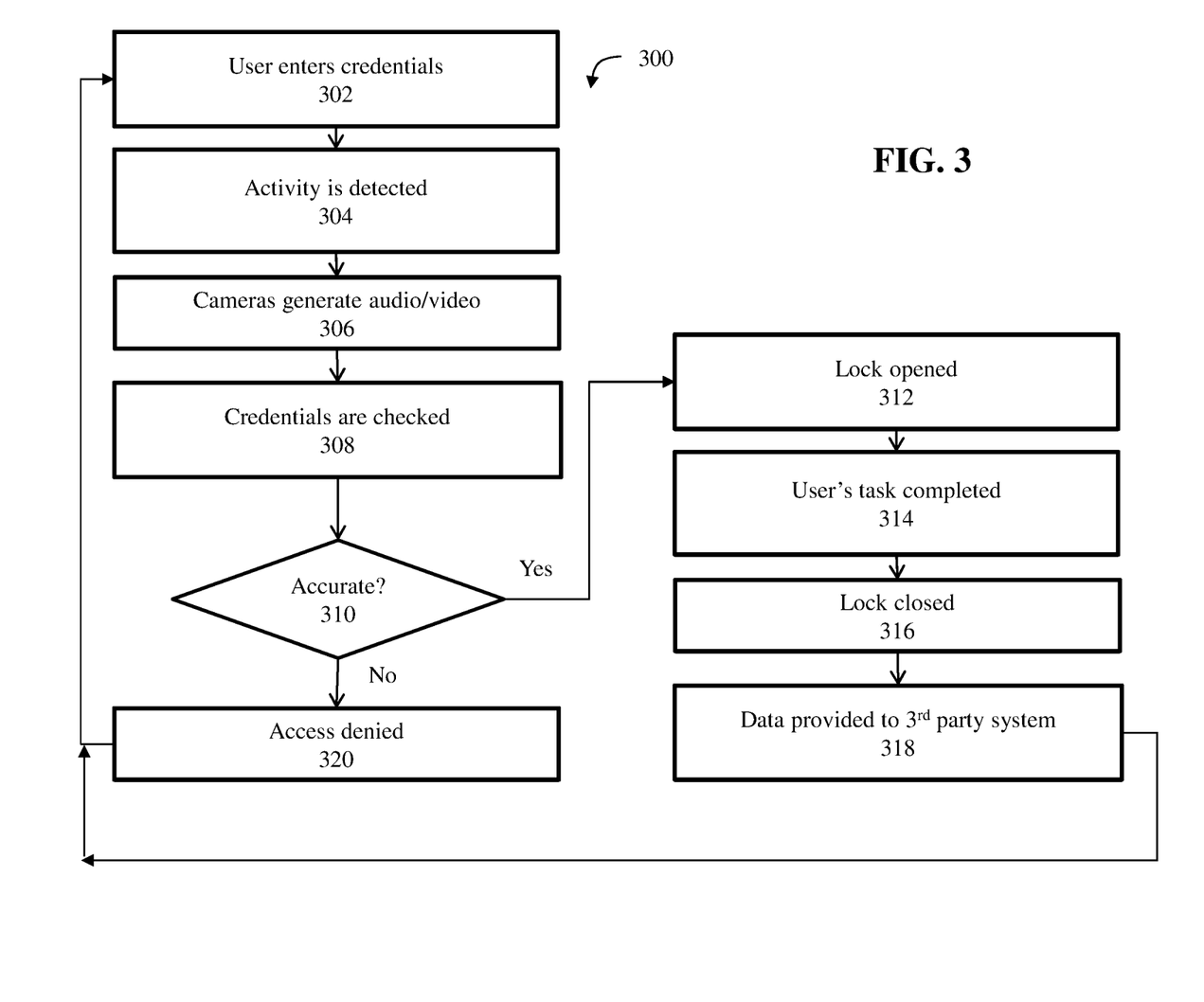
FIG. 3 is a flow chart showing the control flow of the process for providing an auditable security system for a secure enclosure, according to an example embodiment.

FIG. 3 is a flow chart showing the control flow of the general process 300 for providing an auditable security system for a secure enclosure, according to an example embodiment. Process 300 describes the steps that begin to occur when the user 101 interfaces with the user interface 106 of the access control system 104 of the secure enclosure 102. The process 300 is described with reference to FIG. 2, which shows the general data flow 200 of the process 300 for providing an auditable security system for a secure enclosure.

Prior to the beginning of the process 300, it is assumed that the access control system 104 has stored one or more access control lists, lookup tables or other forms of data persistence for storing credentials for users, as described above.

Process 300 starts in earnest with step 302 wherein a user 101 enters a code or other credential into the user interface 106. The access control system 104 stores all audit data 202 regarding step 302, wherein storage may occur at the access control system 104 or database 112 of exterior computing system 110. The action of step 302 may prompt the alarm system 111 to detect activity in step 304. The action of step 302 may also prompt the access control system 104 to send a command to the video management system 108 to starting recording audio/video in step 306. Or the action of step 302 may prompt the cameras themselves to starting recording audio/video in step 306. In step 306, the cameras 128, 138 are activated to start recording video. The video management system 108 stores all audio/video data 204 regarding step 306, wherein storage may occur at the system 108 or database 112 of exterior computing system 110. The alarm system 111 stores all alarm output data 201, wherein storage may occur at the system 111 or database 112 of exterior computing system 110.

In step 308, the access control system 104 checks the credentials entered by the user 101 against its access list and in step 310 determines whether the credentials are accurate. If the credentials are accurate, then in step 312, the access control system 104 opens the electronic lock 105 to provide access to the interior of the secure enclosure 102. If the credentials are not accurate, then access is denied in step 320, the electronic lock remains locked and control flows back to step 302. The action of opening the door or entering the enclosure may prompt the alarm system 111 to detect activity and stores all alarm output data 201, wherein storage may occur at the system 111 or database 112 of exterior computing system 110.

In step 314, the access control system 104 detects that the user 101 has completed his task with the secure enclosure 102 and that the door to the secure enclosure 102 is closed. Again, the action of closing the door or exiting the enclosure may prompt the alarm system 111 to detect activity and stores all alarm output data 201, wherein storage may occur at the system 111 or database 112 of exterior computing system 110. In step 316, the access control system 104 closes the electronic lock 105. In step 318, exterior computing system 110 provides alarm output data 201, audit data 202 and audio/video data 204 stored in database 112 to the third-party system 114, which may perform analytical processes on the data it received. Subsequently, control flows back to step 302.

Figure 4:
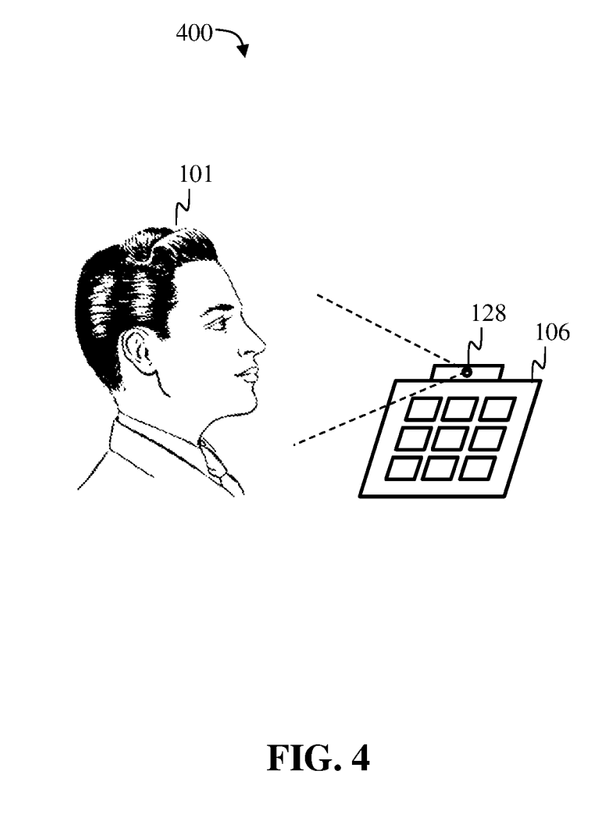
FIG. 4 is an illustration showing the field of view of a camera of the auditable security system within a small secure enclosure, according to an example embodiment.

FIG. 4 is an illustration showing the field of view of a camera 128 of the auditable security system 100 within a small secure enclosure, according to an example embodiment. FIG. 4 shows an embodiment wherein the camera 128 of the auditable security system 100 is located within, or integrated with, the user interface 106 of the access control system 104 (alternatively, the camera 128 may be adjacent to the interface 106). Since the user 101 must look at the keypad 106 when entering a code or other credential, the field of view of the camera 128 is configured in an ideal location for capturing the face of the user 101 when the user enters a code into the keypad. The audio/video data captured by the camera 128 is valuable information for administrators and/or law enforcement to investigate if there is an unlawful diversion of valuables from the secure enclosure.

Figure 5:
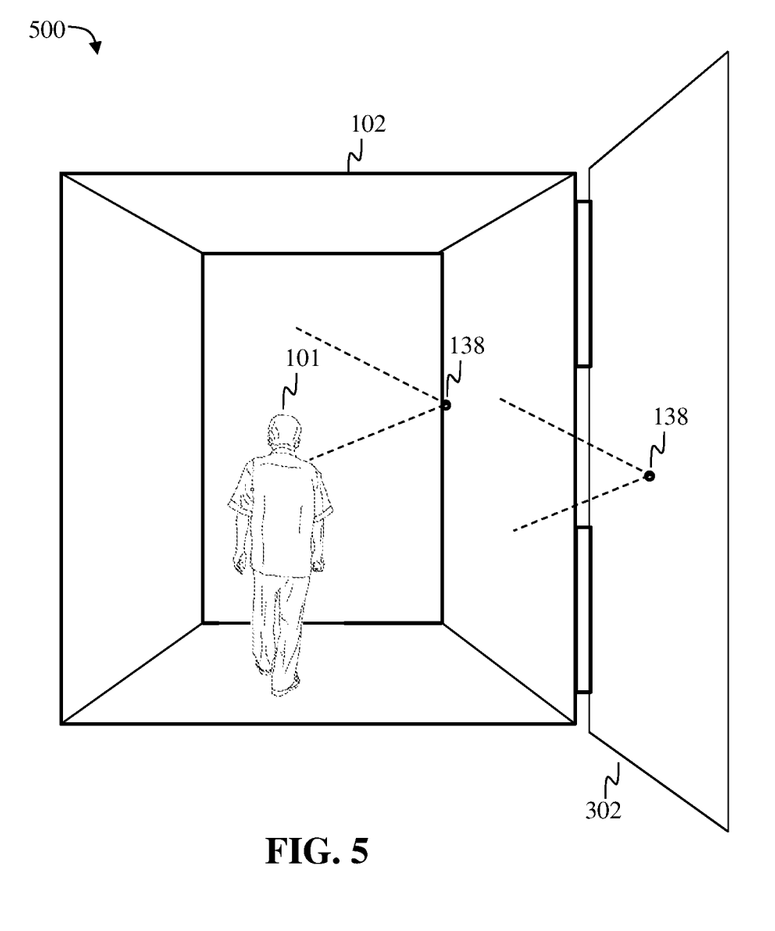
FIG. 5 is an illustration showing the field of view of a camera of the auditable security system within a large secure enclosure, according to an example embodiment.

FIG. 5 is an illustration showing the field of view of a camera of the auditable security system within a large secure enclosure, according to an example embodiment. FIG. 5 shows an embodiment wherein the cameras 138 of the auditable security system 100 are located within, or integrated with, the interior of the secure enclosure 102, which may be a walk-in vault, as well as on the interior surface of the door 302 of the secure enclosure. Since the user 101 must enter the walk-in vault when removing an item from the vault, the fields of view of the cameras 138 are configured in an ideal location for capturing the face and back of the user 101 when the user enters the fault. The audio/video data captured by the cameras 138 is, again, valuable information for administrators and/or law enforcement to investigate if there is an unlawful diversion of valuables from the secure enclosure FIG. 6 is a block diagram of a system including an example computing device 600 and other computing devices. Consistent with the embodiments described herein, the aforementioned actions performed by 104, 108, 110 and 114 may be implemented in a computing device, such as the computing device 600 of FIG. 6. Any suitable combination of hardware, software, or firmware may be used to implement the computing device 600. The aforementioned system, device, and processors are examples and other systems, devices, and processors may comprise the aforementioned computing device. Furthermore, computing device 600 may comprise an operating environment for system 100 and process 300, as described above. Process 300 may operate in other environments and are not limited to computing device 600.

Figure 6:
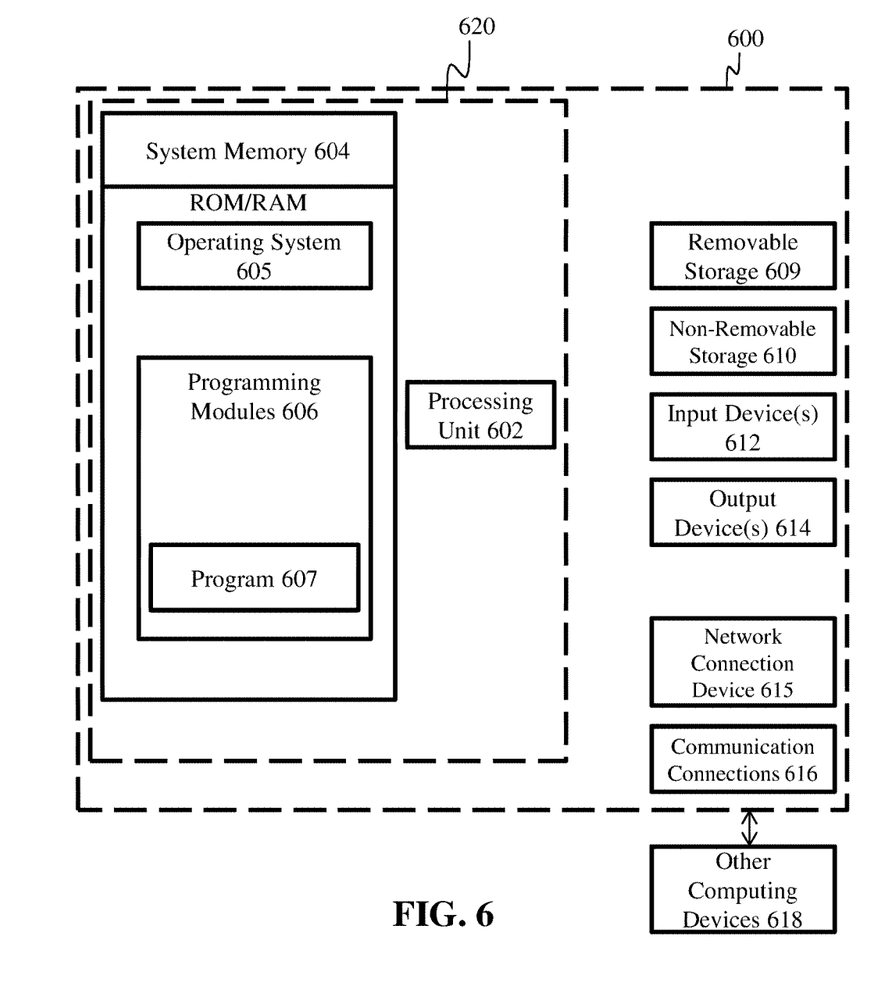
FIG. 6 is a block diagram of a system including a computing device, according to an example embodiment.

With reference to FIG. 6, a system consistent with an embodiment may include a plurality of computing devices, such as computing device 600. In a basic configuration, computing device 600 may include at least one processing unit 602 and a system memory 604. Depending on the configuration and type of computing device, system memory 604 may comprise, but is not limited to, volatile (e.g. random-access memory (RAM)), non-volatile (e.g. read-only memory (ROM)), flash memory, or any combination or memory. System memory 604 may include operating system 605, and one or more programming modules 606. Operating system 605, for example, may be suitable for controlling computing device 600's operation. In one embodiment, programming modules 606 may include, for example, a program module 607 for executing the actions of 104, 108, 110 and 114. Furthermore, embodiments may be practiced in conjunction with a graphics library, other operating systems, or any other application program and is not limited to any particular application or system. This basic configuration is illustrated in FIG. 6 by those components within a dashed line 620.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by a removable storage 609 and a non-removable storage 610. Computer storage media may include volatile and nonvolatile, removable and non-removable media implemented in any method or technology for storage of information, such as computer readable instructions, data structures, program modules, or other data. System memory 604, removable storage 609, and non-removable storage 610 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 600. Any such computer storage media may be part of device 600. Computing device 600 may also have input device(s) 612 such as a keyboard, a mouse, a pen, a sound input device, a camera, a touch input device, etc. Output device(s) 614 such as a display, speakers, a printer, etc. may also be included. Computing device 600 may also include a vibration device capable of initiating a vibration in the device on command, such as a mechanical vibrator or a vibrating alert motor. The aforementioned devices are only examples, and other devices may be added or substituted.

Computing device 600 may also contain a network connection device 615 that may allow device 600 to communicate with other computing devices 618, such as over a network in a distributed computing environment, for example, an intranet or the Internet. Device 615 may be a wired or wireless network interface controller, a network interface card, a network interface device, a network adapter or a LAN adapter. Device 615 allows for a communication connection 616 for communicating with other computing devices 618. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 604, including operating system 605. While executing on processing unit 602, programming modules 606 (e.g. program module 607) may perform processes including, for example, one or more of the stages of the process 300 as described above. The aforementioned processes are examples, and processing unit 602 may perform other processes. Other programming modules that may be used in accordance with embodiments herein may include electronic mail and contacts applications, word processing applications, spreadsheet applications, database applications, slide presentation applications, drawing or computer-aided application programs, etc.

Generally, consistent with embodiments herein, program modules may include routines, programs, components, data structures, and other types of structures that may perform particular tasks or that may implement particular abstract data types. Moreover, embodiments herein may be practiced with other computer system configurations, including handheld devices, multiprocessor systems, microprocessor-based or programmable consumer electronics, minicomputers, mainframe computers, and the like. Embodiments herein may also be practiced in distributed computing environments where tasks are performed by remote processing devices that are linked through a communications network. In a distributed computing environment, program modules may be located in both local and remote memory storage devices.

Furthermore, embodiments herein may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments herein may also be practiced using other technologies capable of performing logical operations such as, for example, AND, OR, and NOT, including but not limited to mechanical, optical, fluidic, and quantum technologies. In addition, embodiments herein may be practiced within a general purpose computer or in any other circuits or systems.

Embodiments herein, for example, are described above with reference to block diagrams and/or operational illustrations of methods, systems, and computer program products according to said embodiments. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments have been described, other embodiments may exist. Furthermore, although embodiments herein have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A security system for preventing unlawful diversion of goods and/or services comprising:
   a) a safe for goods;
   b) an access control system coupled to the safe, wherein the access control system comprises: 1) a user interface that employs multi-factor authentication, and 2) an electronic lock for locking the safe, and 3) a processor configured to activate and deactivate the lock and to capture audit data when a user interacts with the user interface;
   c) a first set of one or more covert cameras proximal to the access control system, wherein the one or more cameras are configured to capture video data of a user interacting with the user interface;
   d) a second set of one or more covert cameras located in an interior of the safe, wherein the one or more cameras are configured to capture video data of a user interacting with the interior of the safe;
   e) a video management system communicatively coupled with the access control system and the first and second set of one or more cameras, wherein the video management system is configured to activate and deactivate the first and second set of one or more cameras;
   f) an alarm system communicatively coupled with the access control system, wherein the alarm system comprises a vibration sensor, a motion sensor, a heat sensor, and a seismic sensor, wherein the alarm system is configured to: detect activity in or near the safe, detect opening and closing of the safe, detect vibration data, motion sensor data, heat sensor data, and seismic data and generate alarm output data including said activity in or near the safe, said opening and closing of the safe, and said vibration data, motion sensor data, heat sensor data, and seismic data;
   g) a network connection device that communicatively couples the access control system, video management system and alarm system with the Internet;
   h) an exterior computing system communicatively coupled with the access control system, the alarm system and the video management system via a network connection device that communicatively couples the exterior computing system to the Internet, wherein the exterior computing system is located remotely from the safe, and wherein the exterior computing system is configured to: store the audit data, alarm output data and video data;
   allow users to interface with the audit data, alarm output data and video data; perform a formatting process to place the audit data, alarm output data and video data in a format that is compatible with third party software, and interface with third party software to provide access to the audit data, alarm output data and video data that was formatted; and
   i) a database communicatively coupled with the exterior computing system, the database configured for storing the audit data, alarm output data and video data.

2. The system of claim 1, wherein the user interface further includes a keypad.

3. The system of claim 2, wherein the electronic lock comprises one or more bolts that secure a door, wherein the bolts are electronically activated and deactivated.

4. The system of claim 3, wherein the first set of one or more cameras are located adjacent to the user interface.

5. The system of claim 4, wherein the video management system is communicatively coupled with the access control system and the first and second set of one or more cameras via wired connections.

6. The system of claim 5, wherein audit data includes a timestamp, a user identification, a time of engagement, a pointer to corresponding video data and a credentials entered by the user.

7. The system of claim 6, wherein exterior computing system is communicatively coupled with the access control system and the video management system via wired connections.

8. The system of claim 7, wherein the audit data and video data stored in the database is encrypted.

9. A security system for preventing unlawful diversion of goods and/or services comprising:
   a) a safe for goods;
   b) an access control system coupled to the safe, wherein the access control system comprises 1) a user interface that employs multi-factor authentication and a biometric sensor, and 2) an electronic lock for locking the safe, and 3) a processor configured to activate and deactivate the lock and to capture audit data when a user interacts with the user interface;

c) a first set of one or more covert cameras proximal to the access control system, wherein the one or more cameras are configured to capture video data of a user interacting with the user interface;

d) a second set of one or more covert cameras located in an interior of the safe, wherein the one or more cameras are configured to capture video data of a user interacting with the interior of the safe;

e) a video management system communicatively coupled with the access control system and the first and second set of one or more cameras, wherein the video management system is configured to activate and deactivate the first and second set of one or more cameras;

f) an alarm system communicatively coupled with the access control system, wherein the alarm system comprises a vibration sensor, a motion sensor, a heat sensor, and a seismic sensor, wherein the alarm system is configured to: detect activity in or near the safe, detect opening and closing of the safe, detect vibration data, motion sensor data, heat sensor data, and seismic data and generate alarm output data including said activity in or near the safe, said opening and closing of the safe, and said vibration data, motion sensor data, heat sensor data, and seismic data;

g) a network connection device that communicatively couples the access control system, video management system and alarm system with the Internet;

h) an exterior computing system communicatively coupled with the access control system, the alarm system and the video management system via a network connection device that communicatively couples the exterior computing system to the Internet, wherein the exterior computing system is located remotely from the safe, and wherein the exterior computing system is configured to: store the audit data, alarm output data and video data; allow users to interface with the audit data, alarm output data and video data; perform analytical processes on the audit data, alarm output data and video data; perform a formatting process to place the audit data, alarm output data and video data in a format that is compatible with third party software, and interface with third party software to provide access to the audit data, alarm output data and video data that was formatted; and i) a database communicatively coupled with the exterior computing system, the database configured for storing the audit data, alarm output data and video data.

10. The system of claim 9, wherein the user interface is a keypad.

11. The system of claim 10, wherein the electronic lock comprises one or more bolts that secure a door, wherein the bolts are electronically activated and deactivated.

12. The system of claim 11, wherein the first set of one or more cameras are located adjacent to the user interface.

13. The system of claim 12, wherein the video management system is communicatively coupled with the access control system and the first and second set of one or more cameras via wired connections.

14. The system of claim 13, wherein audit data includes a timestamp, a user identification, a time of engagement, a pointer to corresponding video data and a credentials entered by the user.

15. The system of claim 14, wherein exterior computing system is communicatively coupled with the access control system and the video management system via wired connections.

16. The system of claim 15, wherein the audit data and video data stored in the database is encrypted.

* * * * *